US008635012B2

(12) United States Patent
O'Sullivan et al.

(10) Patent No.: US 8,635,012 B2
(45) Date of Patent: Jan. 21, 2014

(54) OPTIMIZATION OF TRAVEL ROUTING

(75) Inventors: Patrick J. O'Sullivan, Ballsbridge (IE);
Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 12/244,615

(22) Filed: Oct. 2, 2008

(65) Prior Publication Data
US 2010/0088012 A1 Apr. 8, 2010

(51) Int. Cl.
*G01C 21/30* (2006.01)
(52) U.S. Cl.
USPC .......................................... 701/209; 701/200
(58) Field of Classification Search
USPC .......................................................... 701/209
See application file for complete search history.

(56) References Cited

U.S. PATENT DOCUMENTS

| 2003/0225508 | A9* | 12/2003 | Petzold et al. ................ 701/201 |
| 2007/0244633 | A1* | 10/2007 | Phillips et al. ................ 701/207 |
| 2008/0189033 | A1* | 8/2008 | Geelen et al. ................ 701/209 |
| 2009/0157289 | A1* | 6/2009 | Graessley ..................... 701/123 |
| 2009/0287408 | A1* | 11/2009 | Gerdes et al. ................ 701/202 |
| 2010/0010732 | A1* | 1/2010 | Hartman ....................... 701/200 |
| 2010/0076675 | A1* | 3/2010 | Barth et al. ................... 701/200 |
| 2010/0076878 | A1* | 3/2010 | Burr et al. ....................... 705/34 |

* cited by examiner

*Primary Examiner* — Hiep V Nguyen
(74) *Attorney, Agent, or Firm* — Steven M. Greenberg, Esq.; Carey, Rodriguez, Greenberg & O'Keefe

(57) ABSTRACT

Travel routes for a vehicle from a first location of the vehicle to a second location are generated. Different alternative travel routes are calculated from a first location to a second location selected by a user for a specific vehicle in a navigation system. For each of the different alternative travel routes, both estimated emissions of the specific vehicle and also estimated fuel consumption of the specific vehicle when following each of the different alternative travel routes are computed. Subsequently, each of the different alternative travel routes are presented to a user in the navigation system in connection with corresponding estimated emissions and fuel consumption for each of the different alternative travel routes.

16 Claims, 4 Drawing Sheets

OPTIMIZATION OF TRAVEL ROUTING

REFERENCE TO CO-PENDING APPLICATIONS FOR PATENT

The present application is related to the following co-assigned U.S. patent applications, which are expressly incorporated by reference herein:

U.S. application Ser. No. 12/244,605, entitled "ENVIRONMENTALLY AWARE TRAVEL ROUTING", filed on Oct. 2, 2008.

BACKGROUND OF THE INVENTION

The present invention broadly relates to the field of automated travel planning systems and more particularly relates to the field automated travel planning systems accounting for fuel consumption and other environmental impact factors.

Computerized travel routing systems assist motorists in determining preferred routes in traveling between two or more locations. Users typically specify a starting point and a destination and the travel routing system determines the route with the shortest distance between the two locations. Also, computerized travel routing systems determine the route with the shortest travel time between the two locations. Various Web sites currently provide similar functionality to online users. Of note, several car manufacturers have incorporated similar computerized mapping systems into the on-board computer systems of manufactured vehicles.

In general, computerized travel routing systems function as follows. After a user enters a starting location and a destination, the travel routing system accesses a map database containing road information. Each road in the database may be broken up into segments. The segments may begin and end at intersections, speed zones, or a change in the number of lanes. The information of a road segment in the map database may include: the length of the segment, speed limit, and which road segments connect to the endpoints of the segment. The travel routing system may plot out a number of probable routes comprised of road segments connecting the starting point and the destination. An estimated travel time for each route may be calculated by summing the quotient of the distance traveled in a particular speed zone by the speed limit of the zone. A travel route may then be selected based on the shortest travel distance, shortest estimated time required to travel the route or some combination of the two. The selected travel route may then be displayed to the user.

Currently, social, economic and political events have shed light on the importance of maintaining a healthy environment and reducing fuel consumption. Towards this end, eco-friendly products and practices have increased in popularity and a renewed interest in energy efficient or alternative-fuel vehicles has arisen. Thus, there is a modern interest in reducing the impact of humans on the environment and saving fuel. Conventional computerized travel routing systems, however, have not adapted to meet eco-friendly concerns when calculating optimized routes in onboard navigation systems.

BRIEF SUMMARY OF THE INVENTION

In an embodiment of the invention, a method for generating vehicle travel routes is provided. The method includes calculating different alternative travel routes from one location to another location selected by a user for a specific vehicle in a navigation system. The method further includes computing for each of the different alternative travel routes both estimated emissions of the specific vehicle and also estimated fuel consumption of the specific vehicle when following each of the different alternative travel routes. The method further includes presenting each of the different alternative travel routes to a user in the navigation system in connection with corresponding estimated emissions and fuel consumption for each of the different alternative travel routes.

In another embodiment of the invention, a navigation system for generating travel routes for a vehicle is provided. The navigation system includes a processor configured for calculating different alternative travel routes from one location to another location selected by a user for a specific vehicle and computing for each of the different alternative travel routes both estimated emissions of the specific vehicle and also estimated fuel consumption of the specific vehicle when following each of the different alternative travel routes. The navigation system further includes a display for presenting each of the different alternative travel routes to a user in connection with corresponding estimated emissions and fuel consumption for each of the different alternative travel routes.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Figure 1:
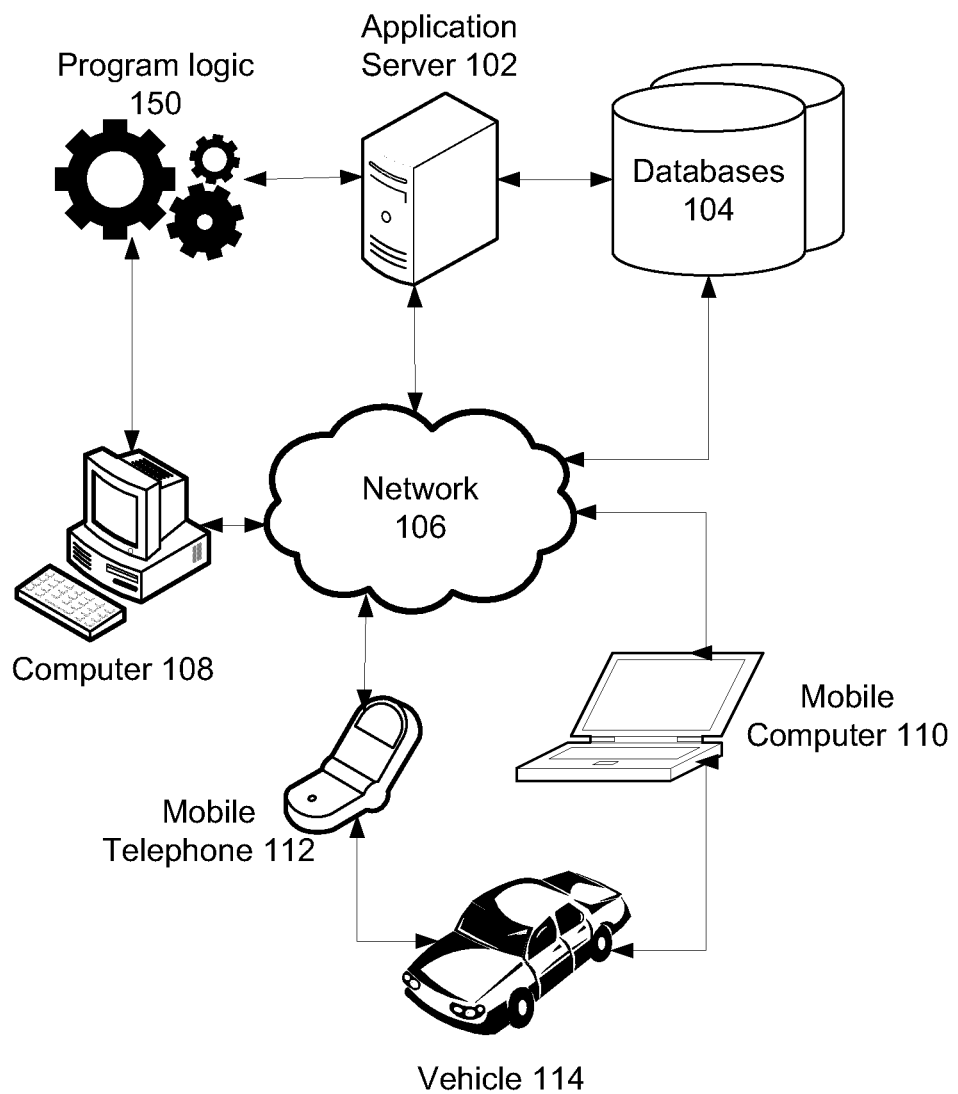
FIG. 1 is block diagram showing a high-level network architecture of a system for generating optimized travel routes for a vehicle, according to an embodiment of the present invention.

As will be appreciated by one skilled in the art, the present invention may be embodied as a method, data processing system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with an embodiment of the present invention, multiple different travel routes for a specified vehicle can be determined between two points of interest in a navigation system such as a web based mapping program, an onboard vehicle navigation system or a handheld vehicle navigation system. Thereafter, the emissions and fuel consumption of the specified vehicle can be computed for each travel route. The different travel routes can be presented through the navigation system in connection with the computed emissions and fuel consumption for the route. In this way, an end user can select a particular one of the travel routes in order to minimize emissions and fuel consumption.

In more specific illustration of an embodiment of the invention, FIG. 1 pictorially shows a high-level architecture for a system for computing travel routes based on the environmental impact of a given travel route. As shown in FIG. 1, computer 108, connected to a network 106 may be a single desktop or laptop personal computer utilized by a single customer or consumer. FIG. 1 also shows an application server 102 accessible to computer 108 via the network 106, for example a data communications network or a public switched telephone network or wireless communications network supporting data communications. Application server 102 may provide to computer 108 execution support for program logic 150 enabled to generate optimized travel routes for a vehicle. In this embodiment, program logic 150 acts as an Internet based navigation system.

Specifically, program logic 150 provides a process for generating optimized travel routes for a vehicle, as described in greater detail below. Program logic 150 can include computer source code, object code, scripting language code or interpreted language code that sets forth computer instructions that perform various functions of the present invention. Program logic 150 can be implemented as firmware, software or any combination of the two. In one embodiment of the present invention, program logic 150 may reside solely on application server 102, which provides the aforementioned travel routing optimization process to computer 108 via the network 106, such as via a client-server relationship. In another embodiment of the present invention, program logic 150 may reside solely on computer 108. In yet another embodiment of the present invention, program logic 150 may reside in a distributed fashion on any combination of computer 108, application server 102 and any other computer providing services over the network 106.

Note that although only one computer 108 is shown, the present invention supports any number of computers operated by consumers or customers. Note also that although only one application server 102 is shown, the present invention supports any number of application servers supporting the execution of program logic 150 providing travel routing optimization to various customers over network 106.

One or more databases 104 are utilized for storing information used during the travel routing optimization process, such as environmental condition data, automobile-specific data, geographical data and traffic data. Databases 104 may be logically connected to application server 102, databases 104 may be separate, autonomous entities accessible via network 106 or databases 104 may be any combination of the two.

FIG. 1 also shows mobile computer 110 and mobile telephone 112, representing different incarnations of computer 108. In this embodiment, mobile computer 110 and/or mobile telephone 112 may be used as navigation systems while on the road in vehicle 114. Also in this embodiment, mobile computer 110 and mobile telephone 112 may communicate wirelessly with network 106. Mobile computer 110 may be a computer that is separable from vehicle 114 (such as a portable GPS device) or may be a computer that is integrated with the vehicle 114, such as an onboard vehicle navigation system that includes a GPS system.

Figure 2:
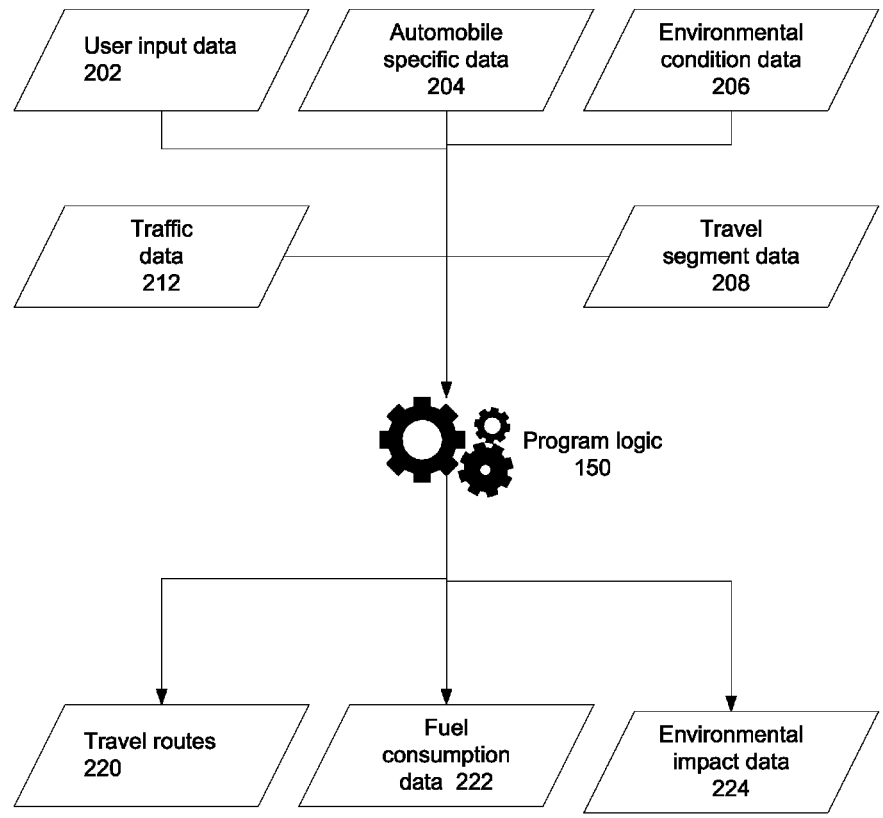
FIG. 2 is a block diagram showing the various data that is input and output by a system for generating optimized travel routes for a vehicle, according to an embodiment of the present invention.

In more specific illustration of an embodiment of the invention, FIG. 2 pictorially shows the various data that is input and output by a system for computing travel routes based on the environmental impact of a given travel route. User input data 202 may represent a unique identifier for a vehicle, such as the make and model of an automobile, and may include other types of data such as the type of fuel used by the automobile (gasoline, diesel, ethanol, etc.) and the general type of automobile (compact, SUV, etc.). User input data 202 also includes a starting location (such as an address or a GPS coordinate) and a destination. The user input data 202 may be entered by a customer or consumer via a graphical user interface, such as that described below with reference to FIG. 3.

Additional data that may be input into program logic 150 when performing the travel routing optimization process includes automobile specific data 204, which pertains to data that is specific to the automobile specified by the user in user input data 202. For example, automobile specific data 204 may include the rated fuel economy of the automobile (such as the miles per gallon rating of the vehicle in a city setting and the miles per gallon rating of the vehicle in a highway setting) and the emissions rating of the automobile. Automobile specific data 204 may also include the type of fuel used by the automobile, the general type of the automobile and the amount of noise produced by the automobile.

Additional input data may include environmental condition data 206, which pertains to the conditions of the environment along a travel route. For example, environmental condition data 206 may include the air quality along the travel route, the weather along the travel route, wind behavior along the travel route, the temperature along the travel route, the UV index along the travel route, and the population density along the travel route. Environmental condition data 206 may also include environmental event data, such as animal mating season dates, animal migration season dates, and pollination cycle dates. Yet further, additional input data may include traffic data 212, which pertains to current or historical traffic patterns along a travel route. Lastly, additional input data may include travel segment data 208. Any of the aforementioned input data may be retrieved from a database, such as one of the databases 104, or from a database in the user's vehicle.

Program logic 150 calculates optimized travel routes 220 by piecing together a plurality of segments, or road segments, retrieved as travel segment data 208. The output or result of the process performed by program logic 150 is a set of travel routes 220, each of which includes a description of a plurality of segments that together comprise a complete travel route. Using travel segment data 208, a travel route comprises a plurality of road segments connecting the starting point and the destination. Additional outputs or results of the process performed by program logic 150 are fuel consumption data 222 and environmental impact data 224. For each travel route, program logic 150 calculates fuel consumption 222 of the specified vehicle during the travel route. Various factors that affect fuel consumption are taken into account, such as: automobile specific data 204 (fuel economy rating of the automobile, general type of automobile, fuel type of the automobile), environmental condition data 206 along the travel route (temperature, weather along the travel route), travel segment data 208 (altitude of travel segments), and traffic data 212 along the travel route.

Also, program logic 150 calculates the environmental impact 224 of the specified vehicle during each travel route 220. Various factors that affect environmental impact are taken into account, such as: automobile specific data 204 (emissions rating of the automobile, fuel type of the automobile, amount of noise produced by the automobile, fuel economy rating of the automobile), environmental condition data 206 along the travel route (air quality along the travel route 220, environmental events that may be occurring along the travel route, population density along the travel route), travel segment data 208 (altitude of travel segments), and traffic data 212 along the travel route.

In one embodiment of the present invention, travel routes 220 are calculated such that each travel route achieves one or more predefined constraints, such as minimization of environmental impact by the vehicle during a travel route, minimization of fuel consumption during a travel route, minimization of the travel time by the vehicle during a travel route and minimization of the distance traveled by the vehicle during a travel route. In this embodiment, a user may specify one or more predefined constraints that may be achieved by program logic 150.

Figure 3:
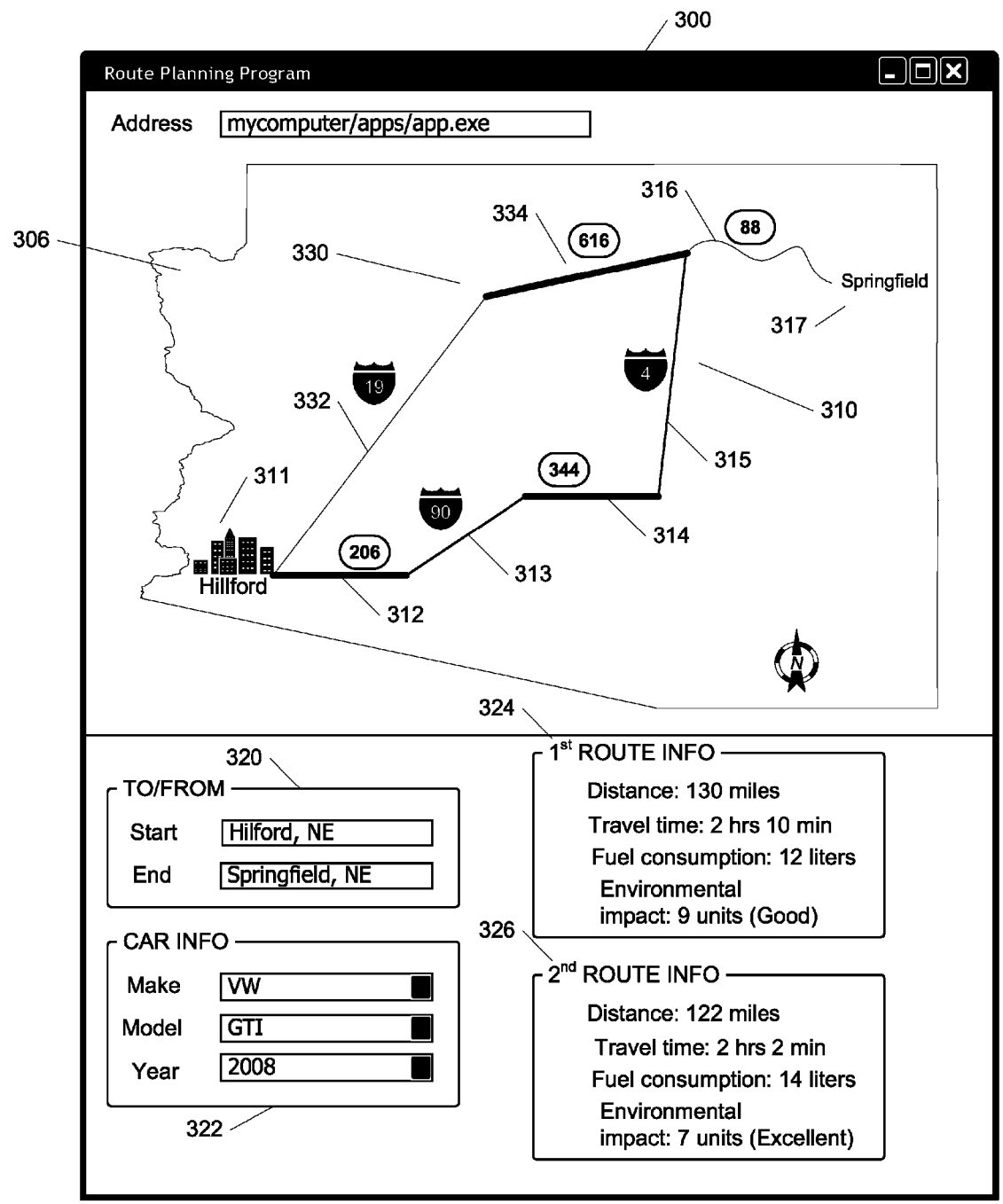
FIG. 3 is an illustration of a graphical user interface for providing optimized travel routes for a vehicle to a user, according to an embodiment of the present invention.

In more specific illustration of an embodiment of the invention, FIG. 3 pictorially shows a graphical user interface 300 for providing travel routes to a user based on the environmental impact of a given travel route. FIG. 3 shows that the user interface 300 is a conventional web browser. Interface 300 may be displayed on computer 108, mobile telephone 112 or mobile computer 110. FIG. 3 shows user interface 300 includes widget group 320 that includes a text field for entering a starting location and a text field for entering the destination location. User interface 300 also shows widget group 322 including three pull down menus for specifying the make, model and year of the vehicle which will be taking the specified trip. Based on the information provided in widget groups 320 and 322 (i.e., user input data 202), as well as other input data (such as automobile specific data 204, environmental condition data 206, travel segment data 208, and traffic data 212), program logic 150 produces the travel routes 310 and 330 (i.e., travel routes 220), as well as related information in data groups 324, 326, including fuel consumption of the vehicle during the travel routes 310, 330 and environmental impact of the vehicle during the travel routes 310, 330 (i.e., fuel consumption data 222 and environmental impact data 224).

FIG. 3 shows that the travel route 310 displayed within map 306 includes a graphical representation of various road segments 312, 313, 314, 315, 316 that comprise the travel route 310, which begins at starting point 311 and ends at destination 317. Note that each road segment 312, 313, 314, 315, 316 is associated with an identifier, such as an interstate symbol or a state road symbol. Note also that each road segment 312, 313, 314, 315, 316 is associated with a line thickness that indicates fuel consumption—a thick line indicates a road segment with a high fuel consumption while a thinner line indicates a road segment with a low fuel consumption. Alternatively, color coding could be used to indicate fuel consumption of road segments.

FIG. 3 shows that data group 324 includes the distance traveled for travel route 310, the travel time for travel route 310, the fuel consumption for travel route 310 and the calculated environmental impact of travel route 310. FIG. 3 also shows that the alternative travel route 330 displayed within map 306 includes a graphical representation of various road segments 332, 334, 316 that comprise the travel route 330, which begins at starting point 311 and ends at destination 317. FIG. 3 further shows that data group 326 includes the distance traveled for travel route 330, the travel time for travel route 330, the fuel consumption for travel route 330 and the calculated environmental impact of travel route 330. As compared to data group 324 of travel route 310, data group 326 shows the distance traveled for travel route 330 is shorter and the travel time for travel route 330 is shorter. However, because travel route 330 includes a higher average rate of speed along an interstate highway, the fuel consumption for travel route 330 is higher than travel route 310. Because travel route 330 has a shorter distance and travel time than travel route 310, however, the calculated environmental impact of travel route 330 is lower and may therefore more desirable.

In one embodiment of the present invention, multiple automobiles can be selected in widget group 322, resulting in the generation of multiple travel routes, wherein one route corresponds to each separate vehicle. Thus, if a user owns more than one automobile, the multiple travel routes provide a selection of travel routes so that the user can choose the vehicle that meets his criteria for fuel consumption and/or environmental impact. Alternatively, if multiple users are traveling to the same destination, the generation of multiple travel routes can be used to determine which combination of vehicles minimizes fuel consumption and/or environmental impact.

Figure 4:
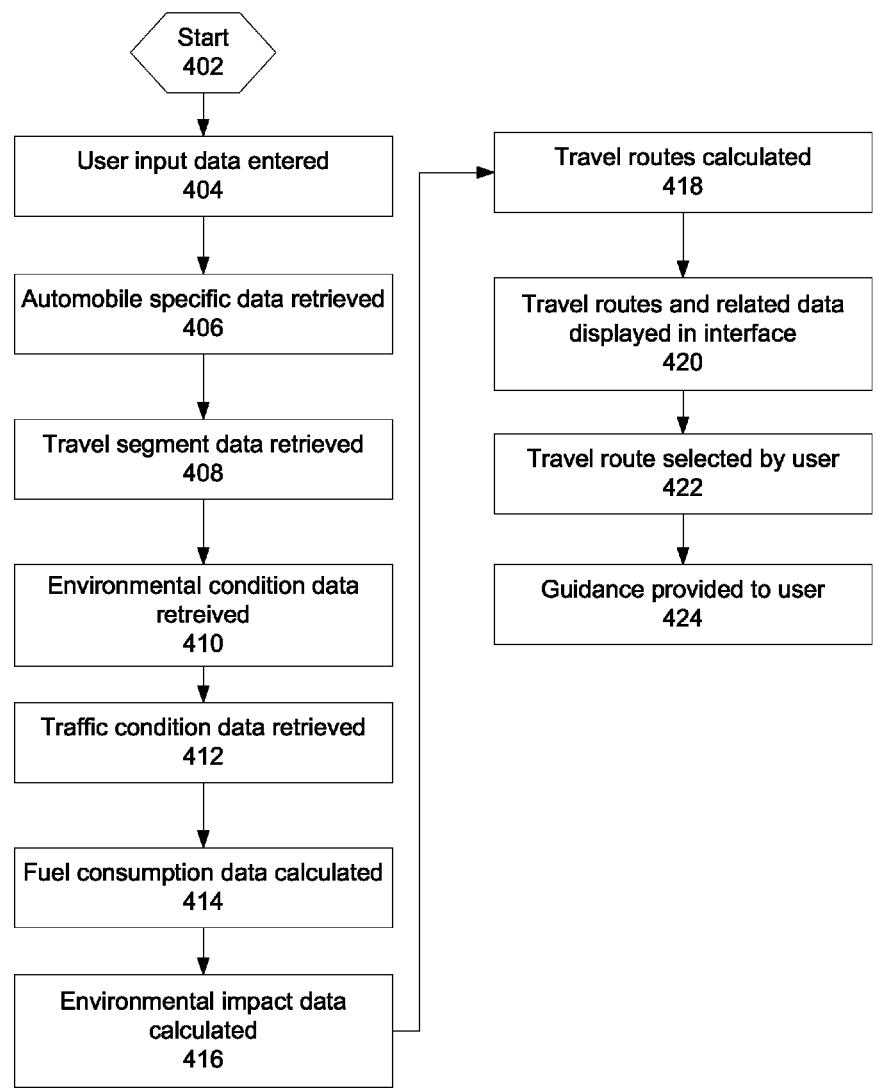
FIG. 4 is a flowchart depicting the control flow of a process for generating optimized travel routes for a vehicle, according to an embodiment of the present invention.

In more specific illustration of an embodiment of the invention, FIG. 4 pictorially depicts a flowchart of a process for computing travel routes based on the environmental impact of a given travel route. FIG. 4 depicts the process executed by program logic 150. The flow chart of FIG. 4 begins with step 402 and moves directly to step 404.

In step 404, user input data 202, such as a unique identifier for a vehicle and starting/destination locations are input. The user input data 202 may be entered by a customer or consumer via a graphical user interface, such as interface 300. Based on the user input data 202, in step 406, automobile specific data 204 is retrieved.

Based on the starting/destination locations of user input data 202, in step 408, travel segment data 208 is retrieved from a route database. Travel segment data 208 includes a series of road segments between the starting/destination locations of user input data 202. In step 410, environmental condition data 206 is retrieved based on the locations of the road segments retrieved in step 408. In step 412, traffic data 212 is retrieved based on the road segments retrieved in step 408.

In step 414, the amount of fuel consumed by the automobile (i.e., fuel consumption data 222) is calculated for various travel routes using the road segments retrieved in step 408. In step 416, the environmental impact of the automobile (i.e., environmental impact data 224) is calculated for various travel routes using the road segments retrieved in step 408. In step 418, travel routes 220 are calculated so as to achieve one or more predefined constraints, such as minimization of environmental impact by the vehicle during each travel route, minimization of fuel consumption by the vehicle during each travel route, minimization of the travel time by the vehicle during each travel route and minimization of the distance traveled by the vehicle during each travel route.

In step 420, the travel routes 220 are displayed in user interface 300. In step 422, the user may select one of the travel routes 220. In step 424, the user may be provided with guidance as to the selected one of the travel routes 220 during travel of the selected travel route. For example, in an embodiment wherein an onboard vehicle navigation system encompasses the computing of travel routes based on the environmental impact as described herein, the onboard vehicle navigation system provides driving instructions to the user as to the selected one of the travel routes 220 while driving the selected travel route.

In one embodiment of the present invention, automobile specific data 204, environmental condition data 206 and/or traffic condition data 212 can be dynamically updated during travel of a travel route 220 and a new travel route can be calculated in mid-route so as to reflect the newly updated data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

We claim:

1. A method for generating vehicle travel routes, comprising:

calculating different alternative travel routes from one location to another location selected in an user interface of a navigation system for a specific vehicle;

computing for each of the different alternative travel routes both estimated emissions of the specific vehicle and also estimated fuel consumption of the specific vehicle when following each of the different alternative travel routes; and displaying on the user interface each of the different alternative travel routes in connection with corresponding estimated emissions and fuel consumption for each of the different alternative travel routes.

2. The method of claim 1, wherein computing for each of the different alternative travel routes both estimated emissions of the specific vehicle and also estimated fuel consumption of the specific vehicle when following each of the different alternative travel routes, comprises computing for each of the different alternative travel routes both estimated emissions of the specific vehicle and also estimated fuel consumption of the specific vehicle when following each of the different alternative travel routes based upon stored emissions data associated with the specific vehicle.

3. The method of claim 1, wherein computing for each of the different alternative travel routes both estimated emissions of the specific vehicle and also estimated fuel consumption of the specific vehicle when following each of the different alternative travel routes, comprises computing for each of the different alternative travel routes both estimated emissions of the specific vehicle and also estimated fuel consumption of the specific vehicle when following each of the different alternative travel routes based upon at least one of environmental conditions for each of the different alternative travel routes and traffic conditions for each of the different alternative travel routes.

4. The method of claim 1, wherein computing for each of the different alternative travel routes both estimated emissions of the specific vehicle and also estimated fuel consumption of the specific vehicle when following each of the different alternative travel routes, comprises computing for each of the different alternative travel routes both estimated emissions of the specific vehicle and also estimated fuel consumption of the specific vehicle when following each of the different alternative travel routes based upon stored fuel consumption data associated with the specific vehicle.

5. A computer program product for generating vehicle travel routes, the computer program product comprising:

a computer usable storage medium having computer usable program code embodied therewith, the computer usable program code comprising:

computer usable program code for calculating different alternative travel routes from one location to another location selected in an user interface of a navigation system for a specific vehicle;

computer usable program code for computing for each of the different alternative travel routes both estimated emissions of the specific vehicle and also estimated fuel consumption of the specific vehicle when following each of the different alternative travel routes; and computer usable program code for displaying on the user interface each of the different alternative travel routes in connection with corresponding estimated emissions and fuel consumption for each of the different alternative travel routes.

6. The computer program product of claim 5, wherein the computer usable program code for computing for each of the different alternative travel routes both estimated emissions of the specific vehicle and also estimated fuel consumption of the specific vehicle when following each of the different alternative travel routes, comprises computer usable program code for computing for each of the different alternative travel routes both estimated emissions of the specific vehicle and also estimated fuel consumption of the specific vehicle when following each of the different alternative travel routes based upon stored emissions data associated with the specific vehicle.

7. The computer program product of claim 6, wherein the computer usable program code for computing for each of the different alternative travel routes both estimated emissions of the specific vehicle and also estimated fuel consumption of the specific vehicle when following each of the different alternative travel routes, comprises computer usable program code for computing for each of the different alternative travel routes both estimated emissions of the specific vehicle and also estimated fuel consumption of the specific vehicle when following each of the different alternative travel routes based upon stored fuel consumption data associated with the specific vehicle.

8. The computer program product of claim 5, wherein the computer usable program code for computing for each of the different alternative travel routes both estimated emissions of the specific vehicle and also estimated fuel consumption of the specific vehicle when following each of the different alternative travel routes, comprises computer usable program code for computing for each of the different alternative travel routes both estimated emissions of the specific vehicle and also estimated fuel consumption of the specific vehicle when following each of the different alternative travel routes based upon at least one of environmental conditions for each of the different alternative travel routes and traffic conditions for each of the different alternative travel routes.

9. A navigation system for generating vehicle travel routes, comprising:

a processor configured:

to calculate different alternative travel routes from one location to another location selected in an user interface of a navigation system for a specific vehicle;

to compute for each of the different alternative travel routes both estimated emissions of the specific vehicle and also estimated fuel consumption of the specific vehicle when following each of the different alternative travel routes; and, to display on the user interface each of the different alternative travel routes in connection with corresponding estimated emissions and fuel consumption for each of the different alternative travel routes.

10. The navigation system of claim 9, wherein estimated emissions of the specific vehicle when following each of the different alternative travel routes is calculated based on stored emissions data associated with the specific vehicle.

11. The navigation system of claim 9, wherein estimated emissions of the specific vehicle when following each of the different alternative travel routes is further calculated based on at least one of environmental conditions for each of the different alternative travel routes and traffic conditions for each of the different alternative travel routes.

12. The navigation system of claim 11, wherein the estimated fuel consumption of the specific vehicle when following each of the different alternative travel routes is calculated based on stored fuel consumption data associated with the specific vehicle.

13. The navigation system of claim 9, wherein the navigation system is embodied in an onboard navigation system in a vehicle.

14. The navigation system of claim 9, wherein the navigation system is embodied in a handheld navigation system.

15. The navigation system of claim 9, wherein the navigation system is embodied in an Internet based navigation system.

16. A method for generating travel routes for a plurality of vehicles, comprising:
- calculating different alternative travel routes from one location to another location for the plurality of vehicles selected in an user interface of a navigation system;
- computing for each of the different alternative travel routes both estimated emissions of the plurality of vehicles and also estimated fuel consumption of the plurality of vehicles when following each of the different alternative travel routes; and
- displaying on the user interface each of the different alternative travel routes in connection with corresponding estimated emissions and fuel consumption for each of the different alternative travel routes.

* * * * *